(12) United States Patent
Wood et al.

(10) Patent No.: US 8,530,069 B2
(45) Date of Patent: Sep. 10, 2013

(54) BATTERY MODULE

(75) Inventors: Steven J. Wood, Shorewood, WI (US); Gary P. Houchin-Miller, Milwaukee, WI (US); Dale B. Trester, Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 36 days.

(21) Appl. No.: 13/106,687

(22) Filed: May 12, 2011

(65) Prior Publication Data

US 2011/0212352 A1  Sep. 1, 2011

Related U.S. Application Data

(60) Division of application No. 12/481,480, filed on Jun. 9, 2009, now Pat. No. 7,951,477, which is a continuation of application No. PCT/US2007/087643, filed on Dec. 14, 2007.

(60) Provisional application No. 60/874,933, filed on Dec. 14, 2006, provisional application No. 60/988,465, filed on Nov. 16, 2007, provisional application No. 60/989,650, filed on Nov. 21, 2007.

(51) Int. Cl.
*H01M 2/10* (2006.01)
*H01M 10/50* (2006.01)

(52) U.S. Cl.
USPC .................................... 429/99; 429/120

(58) Field of Classification Search
USPC ................................ 429/99, 120
See application file for complete search history.

(56) References Cited

U.S. PATENT DOCUMENTS

| | | | |
|---|---|---|---|
| 2,042,806 | A | 6/1936 | Schulte |
| 2,416,079 | A | 2/1947 | Anthony |
| 4,189,473 | A | 2/1980 | Cole et al. |
| 4,554,221 | A | 11/1985 | Schmid |

(Continued)

FOREIGN PATENT DOCUMENTS

| | | |
|---|---|---|
| DE | 10328582 A1 | 1/2004 |
| DE | 102005047034 A1 | 4/2006 |

(Continued)

OTHER PUBLICATIONS

Response to Office Action for European Application No. 07783619.5, mail date Feb. 5, 2010, 9 pages.

(Continued)

*Primary Examiner* — Milton I Cano
*Assistant Examiner* — Brent Thomas
(74) *Attorney, Agent, or Firm* — Fletcher Yoder PC

(57) ABSTRACT

A battery module includes a plurality of cells. The battery module also includes a housing configured to substantially enclose the plurality of cells. The battery module further includes a lower tray configured to receive the plurality of cells. The lower tray is located inside the housing adjacent a bottom of the housing and includes a top side and a bottom side. The top side has a plurality of sockets configured to receive the plurality of cells in a closely packed arrangement. The bottom side is configured to define a chamber between the lower tray and the bottom of the housing. The chamber is sealed off from the rest of the battery module and is configured to receive released gas from the plurality of cells.

21 Claims, 12 Drawing Sheets

(56) References Cited

U.S. PATENT DOCUMENTS

| | | | |
|---|---|---|---|
| 4,957,829 | A | 9/1990 | Holl |
| 5,336,570 | A | 8/1994 | Dodge, Jr. |
| 5,606,238 | A | 2/1997 | Spellman et al. |
| 5,866,276 | A | 2/1999 | Ogami et al. |
| 5,879,833 | A | 3/1999 | Yoshii et al. |
| 6,001,501 | A | 12/1999 | Collie |
| 6,106,972 | A | 8/2000 | Kokubo et al. |
| 6,265,091 | B1 | 7/2001 | Pierson et al. |
| 6,379,831 | B1 | 4/2002 | Draper et al. |
| 6,379,837 | B1 | 4/2002 | Takahashi et al. |
| 6,410,184 | B1 | 6/2002 | Horiuchi et al. |
| 6,410,185 | B1 | 6/2002 | Takahashi et al. |
| 6,465,123 | B1 | 10/2002 | Baumann et al. |
| 6,472,098 | B1 | 10/2002 | Sawada et al. |
| 6,541,154 | B2 | 4/2003 | Oogami et al. |
| 6,558,835 | B1 | 5/2003 | Kurisu et al. |
| 6,656,632 | B2 | 12/2003 | Asaka et al. |
| 6,858,345 | B2 | 2/2005 | Amine et al. |
| 6,896,995 | B2 | 5/2005 | Saito |
| 6,923,837 | B2 | 8/2005 | Longhi et al. |
| 6,932,651 | B2 | 8/2005 | Mita et al. |
| 6,953,638 | B2 | 10/2005 | Inui et al. |
| 7,014,949 | B2 | 3/2006 | Kanai et al. |
| 7,094,496 | B2 | 8/2006 | Rodriguez et al. |
| 7,129,001 | B2 | 10/2006 | Munenaga et al. |
| 7,147,963 | B2 | 12/2006 | Kimoto et al. |
| 7,160,643 | B2 | 1/2007 | Kunimoto et al. |
| 7,189,474 | B2 | 3/2007 | Hamada et al. |
| 7,270,576 | B2 | 9/2007 | Kim et al. |
| 7,351,493 | B2 | 4/2008 | Uemoto et al. |
| 2001/0046624 | A1 | 11/2001 | Goto et al. |
| 2004/0038123 | A1 | 2/2004 | Hisamitsu et al. |
| 2004/0062955 | A1 | 4/2004 | Kubota et al. |
| 2004/0175612 | A1 | 9/2004 | Conti |
| 2004/0229121 | A1* | 11/2004 | Hamada et al. ............... 429/209 |
| 2005/0048365 | A1 | 3/2005 | Miyahisa et al. |
| 2005/0079408 | A1 | 4/2005 | Hirano |
| 2005/0100783 | A1 | 5/2005 | Ro et al. |
| 2005/0170239 | A1 | 8/2005 | Uemoto et al. |
| 2005/0170240 | A1 | 8/2005 | German et al. |
| 2005/0174092 | A1 | 8/2005 | Dougherty et al. |
| 2005/0287427 | A1 | 12/2005 | Kim et al. |
| 2006/0026822 | A1 | 2/2006 | Seman et al. |
| 2006/0040173 | A1 | 2/2006 | Shimamura et al. |
| 2006/0063067 | A1 | 3/2006 | Kim |
| 2006/0073378 | A1 | 4/2006 | Hamery et al. |
| 2006/0073379 | A1 | 4/2006 | Kim et al. |
| 2006/0078789 | A1 | 4/2006 | Wegner |
| 2006/0162149 | A1 | 7/2006 | Ha et al. |
| 2006/0177734 | A1 | 8/2006 | Yao |
| 2006/0204840 | A1 | 9/2006 | Jeon et al. |
| 2006/0216582 | A1 | 9/2006 | Lee et al. |
| 2006/0216583 | A1 | 9/2006 | Lee et al. |
| 2006/0234119 | A1 | 10/2006 | Kruger et al. |
| 2006/0246350 | A1 | 11/2006 | Takayama et al. |
| 2007/0015050 | A1 | 1/2007 | Jung et al. |
| 2007/0026303 | A1 | 2/2007 | Jeon et al. |
| 2007/0026305 | A1 | 2/2007 | Jeon et al. |
| 2007/0026306 | A1 | 2/2007 | Lee et al. |
| 2007/0026739 | A1 | 2/2007 | Kim et al. |
| 2007/0037051 | A1 | 2/2007 | Kim et al. |
| 2008/0160395 | A1 | 7/2008 | Okada et al. |
| 2009/0075158 | A1 | 3/2009 | Rudorff et al. |
| 2009/0111015 | A1 | 4/2009 | Wood et al. |
| 2010/0183904 | A1 | 7/2010 | Muis |

FOREIGN PATENT DOCUMENTS

| | | | |
|---|---|---|---|
| EP | 0 607 675 B1 | | 7/1994 |
| EP | 1 030 388 A1 | | 8/2000 |
| EP | 1 109 237 A1 | | 6/2001 |
| EP | 1 213 784 A2 | | 6/2002 |
| EP | 1109237 B1 | * | 1/2005 |
| EP | 1 503 442 A2 | | 2/2005 |
| EP | 1 553 655 A2 | | 7/2005 |
| EP | 1 250 720 B1 | | 5/2006 |
| EP | 1 786 051 A1 | | 5/2007 |
| EP | 1 935 699 A1 | | 6/2008 |
| FR | 2058740 A5 | | 5/1971 |
| FR | 2585185 A1 | | 1/1987 |
| GB | 2 136 629 A | | 9/1984 |
| JP | 3-219551 | * | 9/1991 |
| JP | 3219551 A | | 9/1991 |
| JP | 8255637 A | | 10/1996 |
| JP | 2001-283940 | * | 10/2001 |
| JP | 2001283940 A | | 10/2001 |
| JP | 2002151025 A | | 5/2002 |
| JP | 2003308823 A | | 10/2003 |
| JP | 2007012487 A | | 1/2007 |
| JP | 2007280831 A | | 10/2007 |
| WO | WO 2005/043650 A2 | | 5/2005 |
| WO | WO 2007/043691 A1 | | 4/2007 |
| WO | WO 2007/118437 A1 | | 10/2007 |
| WO | WO 2007/134198 A1 | | 11/2007 |
| WO | WO 2008/021230 A2 | | 2/2008 |
| WO | WO 2008/027343 A1 | | 3/2008 |
| WO | WO 2008/074034 A1 | | 6/2008 |
| WO | WO 2008/086417 A2 | | 7/2008 |
| WO | WO 2008/098193 A2 | | 8/2008 |
| WO | WO 2009/016476 A2 | | 2/2009 |
| WO | WO 2010/019764 A2 | | 2/2010 |
| WO | WO 2010/085636 A2 | | 7/2010 |

OTHER PUBLICATIONS

Office Action for European Application No. 07836697.8, mail date Aug. 31, 2009, 2 pages.
Response to Office Action for European Application No. 07836697.8, mail date Jan. 6, 2010, 6 pages.
Office Action for European Application No. 07836697.8, mail date Feb. 17, 2010, 3 pages.
Response to Office Action for European Application No. 07836697.8, mail date Jun. 25, 2010, 9 pages.
Office Action for European Application No. 09012377.9, mail date Jun. 1, 2010, 1 page.
Response to Office Action for European Application No. 09012377.9, mail date Sep. 28, 2010, 14 pages.
Office Action for European Application No. 09012377.9, mail date Oct. 7, 2010, 3 pages.
Response to Office Action for European Application No. 09012377.9, mail date Feb. 10, 2011, 5 pages.
Office Action for European Application No. 0783619.5, mail date Jan. 31, 2011, 61 pages.
Reply and Amendment for U.S. Appl. No. 12/481,480, mail date Dec. 1, 2009, 17 pages.
Office Action for U.S. Appl. No. 12/481,480, mail date Mar. 17, 2010, 10 pages.
Reply and Amendment for U.S. Appl. No. 12/481,480, mail date Jun. 17, 2010, 14 pages.
Office Action for U.S. Appl. No. 12/481,480, mail date Sep. 2, 2010, 10 pages.
Reply and Amendment for U.S. Appl. No. 12/481,480, mail date Nov. 24, 2010, 11 pages.
Reply and Amendment for U.S. Appl. No. 12/481,480, mail date Jan. 11, 2011, 9 pages.
Notice of Allowance for U.S. Appl. No. 12/481,480, mail date Jan. 26, 2011, 6 pages.
Office Action of Chinese Patent Application No. 200780029735.5 with English translation, mail date Jun. 25, 2010, 10 pages.
European Search Report for European Application No. 09012377.9, mail date Dec. 22, 2009, 10 pages.
International Preliminary Report on Patentability, Written Opinion of the International Searching Authority and International Search Report for International Application No. PCT/US2007/017785, mail dale Mar. 3, 2008, 15 pages.
International Preliminary Report on Patentability for International Application No. PCT/US2007/087643, mail date Jun. 25, 2009, 9 pages.
International Preliminary Report on Patentability for International Application No. PCT/IB2008/001984, mail date Feb. 2, 2010, 6 pages.

International Search Report for International Application No. PCT/US2007/068716, mail date Oct. 17, 2007, 5 pages.
International Search Report and Written Opinion for European Patent Application No. PCT/US2007/087643, mail date Apr. 16, 2008, 17 pages.
International Search Report for International Application No. PCT/IB2008/001984, mail date Feb. 4, 2009, 2 pages.
International Search Report with English translation for International Application No. PCT/EP2009/001460, mail date May 25, 2009, 6 pages.
International Search Report and Written Opinion for International Application No. PCT/US2009/053697, mail date Mar. 23, 2010, 6 pages.
International Search Report for International Application No. PCT/US2010/021791, mail date Aug. 13, 2010, 3 pages.
Written Opinion of International Application No. PCT/US2007/068716, mail date Oct. 17, 2007, 6 pages.
Written Opinion for International Application No. PCT/EP2009/001460, mail date May 25, 2009, 6 pages.
European Office Action for Application No. 07855186.8, mail date May 25, 2010, 6 pages.
Response to Office Action for European Application No. 07855186.8, mail date Sep. 23, 2010, 9 pages.
Office Action for Chinese Application No. 200780025271.0 with English translation, mail date Sep. 8, 2010, 4 pages.
Office Action for European Application No. 07783619.5, mail date Jul. 29, 2009, 4 pages.

* cited by examiner

BATTERY MODULE

CROSS-REFERENCE TO RELATED APPLICATIONS

This application is a Divisional Patent Application of U.S. patent application Ser. No. 12/481,480 now U.S. Pat. No. 7,951,477, filed Jun. 9, 2009, which is a Continuation of International Patent Application No. PCT/US2007/087643, filed Dec. 14, 2007, which claims the benefit of and priority to U.S. Provisional Patent Application No. 60/874,933, filed Dec. 14, 2006, U.S. Provisional Patent Application No. 60/988,465, filed Nov. 16, 2007, and U.S. Provisional Patent Application No. 60/989,650, filed Nov. 21, 2007.

The disclosures of the following patent applications are incorporated by reference in their entirety: U.S. patent application Ser. No. 12/481,480 now U.S. Pat. No. 7,951,477, International Patent Application No. PCT/US2007/087643; U.S. Provisional Patent Application No. 60/874,933; U.S. Provisional Patent Application No. 60/988,465; and U.S. Provisional Patent Application No. 60/989,650.

BACKGROUND

The present application relates to battery modules or systems for use in vehicles such as hybrid electric or electric vehicles.

There is a need for a battery module design that provides increased resistance to damage in the event of a vehicle crash. There is also a need for a battery module that has improved cooling characteristics for the battery cells included in the module. These needs and other benefits and advantages are addressed below with regard to the various disclosed embodiments.

SUMMARY

According to one embodiment, a battery module includes a plurality of cells. The battery module also includes a housing configured to substantially enclose the plurality of cells. The battery module further includes a lower tray configured to receive the plurality of cells. The lower tray is located inside the housing adjacent a bottom of the housing and includes a top side and a bottom side. The top side has a plurality of sockets configured to receive the plurality of cells in a closely packed arrangement. The bottom side is configured to define a chamber between the lower tray and the bottom of the housing. The chamber is sealed off from the rest of the battery module and is configured to receive released gas from the plurality of cells.

According to another embodiment, a battery module includes a plurality of cells. The battery module also includes a housing configured to contain the plurality of cells. The battery module further includes a lower tray located inside the housing adjacent a bottom of the housing. The lower tray comprises a plurality of sockets. Each socket is configured to receive one of the plurality of cells. The battery module further includes an upper tray located inside the housing adjacent a top of the housing. The upper tray includes a plurality of sockets. Each socket is configured to receive the corresponding cell from the lower tray. The battery module further includes a common chamber defined by a bottom of the lower tray and the bottom of the housing, the common chamber configured to receive gas expelled from the plurality of cells. The battery module further includes a seal located on an upper side of the lower tray and is configured to seal the connection between the plurality of cells and the lower tray to maintain the gas in the common chamber. The battery module further includes a clamping plate located above the seal to clamp the seal between the lower tray and the clamping plate.

DETAILED DESCRIPTION

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

According to an exemplary embodiment, a battery module includes a plurality of electrochemical cells or batteries arranged in two groups. The batteries are arranged in trays and are surrounded by an outer housing. The trays include a plurality of sockets, sleeves or hollows configured to align and locate cells. Bus bars or connectors are used to couple the batteries together and partially by protrusions or walls on the upper tray to reduce the chance of a short circuit. The lower trays include a plurality of protrusions or standoffs and a wall that defines a volume below the cells that is configured to isolate any gases vented from the interior of the cells. Because the gasses vented from the cells may be hazardous, it is desirable to contain any vented gasses and keep them isolated from the environment. The two groups of cells are separated by a central plenum air space and a divider. The arrangement of the cells allows the module to be compressed thereby reducing damage to the cells when the module is crushed or compressed.

Figure 1:
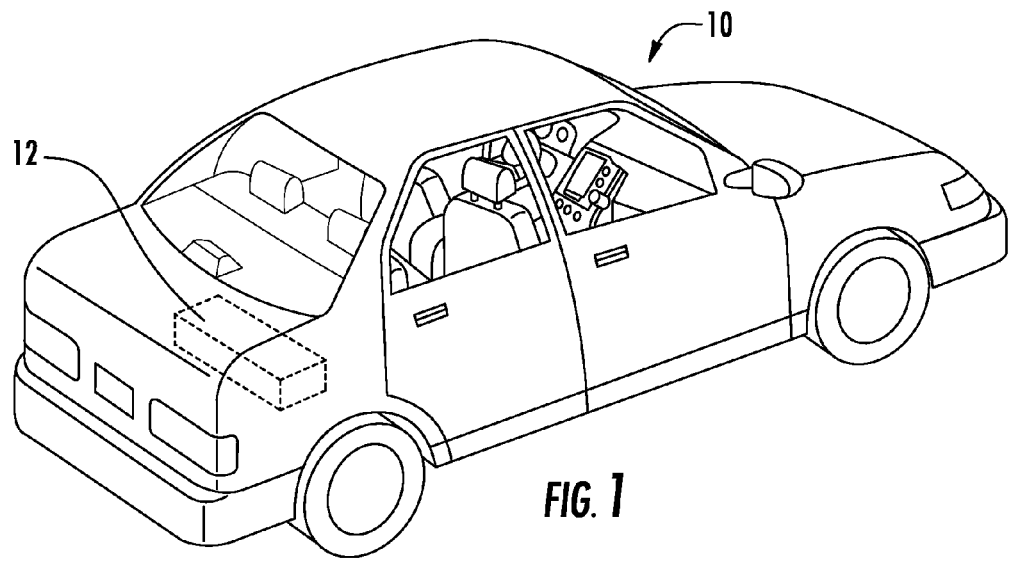
FIG. 1 is a perspective view of vehicle with a battery module according to an exemplary embodiment.

Referring to FIG. 1, a vehicle 10 (e.g., a hybrid-electric vehicle (HEV) or plug in HEV (PHEV)) is shown including a battery module 12 according to an exemplary embodiment. While particular exemplary embodiments of the battery module are shown and described, it should be understood that the size, shape, configuration, and/or position of the battery module may vary according to various exemplary embodiments.

Figure 2:
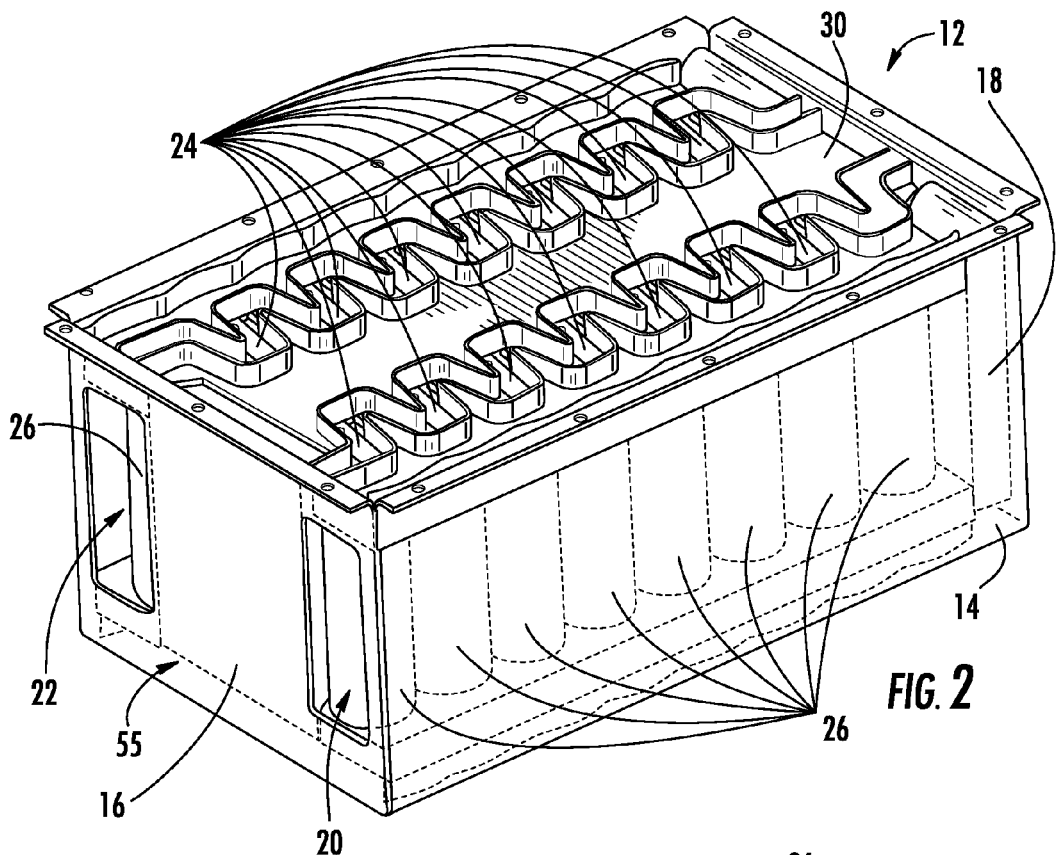
FIG. 2 is a perspective view of a battery module according to one exemplary embodiment.

A battery module 12 is shown according to an exemplary embodiment in FIG. 2 and includes a housing 14, air baffles 16, 18, two battery packs 20, 22, and connectors 24 conductively coupling a plurality of batteries or cells 26 in a circuit. According to an exemplary embodiment, thirty-two cells 26 are included in the battery module 12. According to other exemplary embodiments, a different number of batteries or cells may be included in a battery module.

Figure 9:
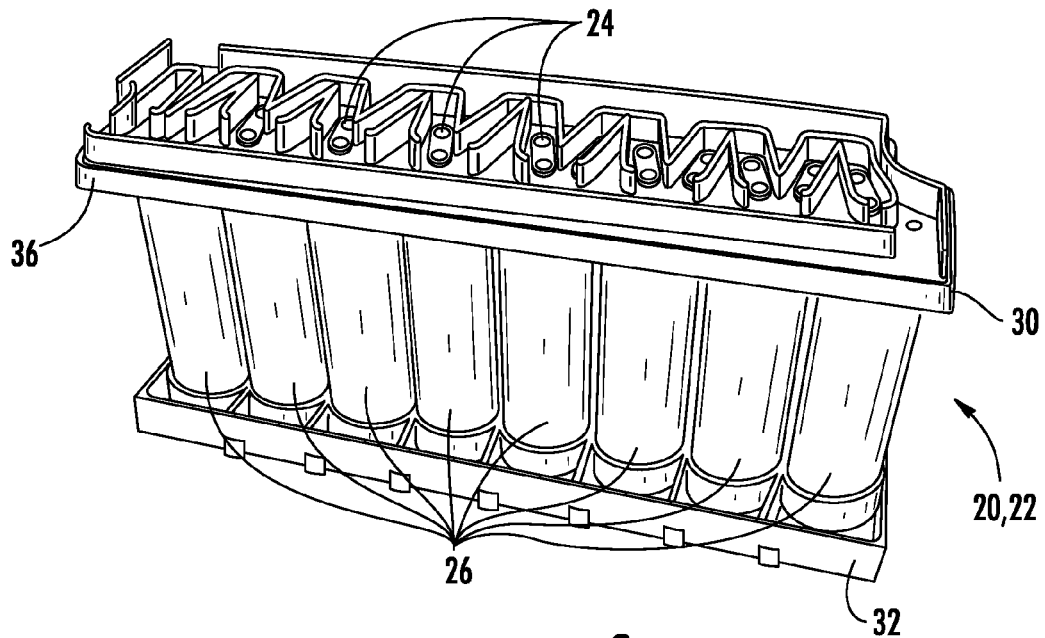
FIGS. 9 and 10 are perspective views of a pack from an alternative embodiment of the battery module shown in FIG. 2.

Each of the battery packs 20, 22 (shown, for example, in FIGS. 9 and 10 according to an exemplary embodiment) include a plurality of batteries or cells 26 and upper and lower trays 30, 32. According to an exemplary embodiment, and referring to FIGS. 4 and 5, the cells 26 are generally cylindrical lithium-ion cells. According to other exemplary embodiments, the batteries or cells may be another type of electrochemical cell (e.g., Nickel Metal Hydride cells, lithium polymer cells, etc.). Also, the cells may be configured in various suitable geometric configurations such as, for example, prismatic, cylindrical, polygonal, etc.

Figure 3:
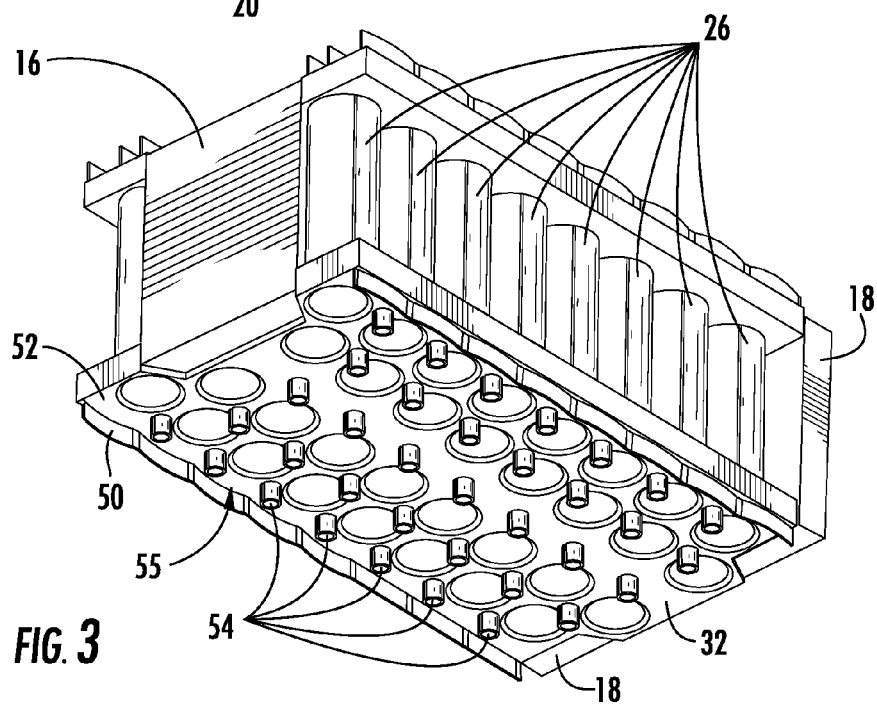
FIG. 3 is a perspective view of the batteries, baffles and trays from the battery module shown in FIG. 2.
Figure 10:
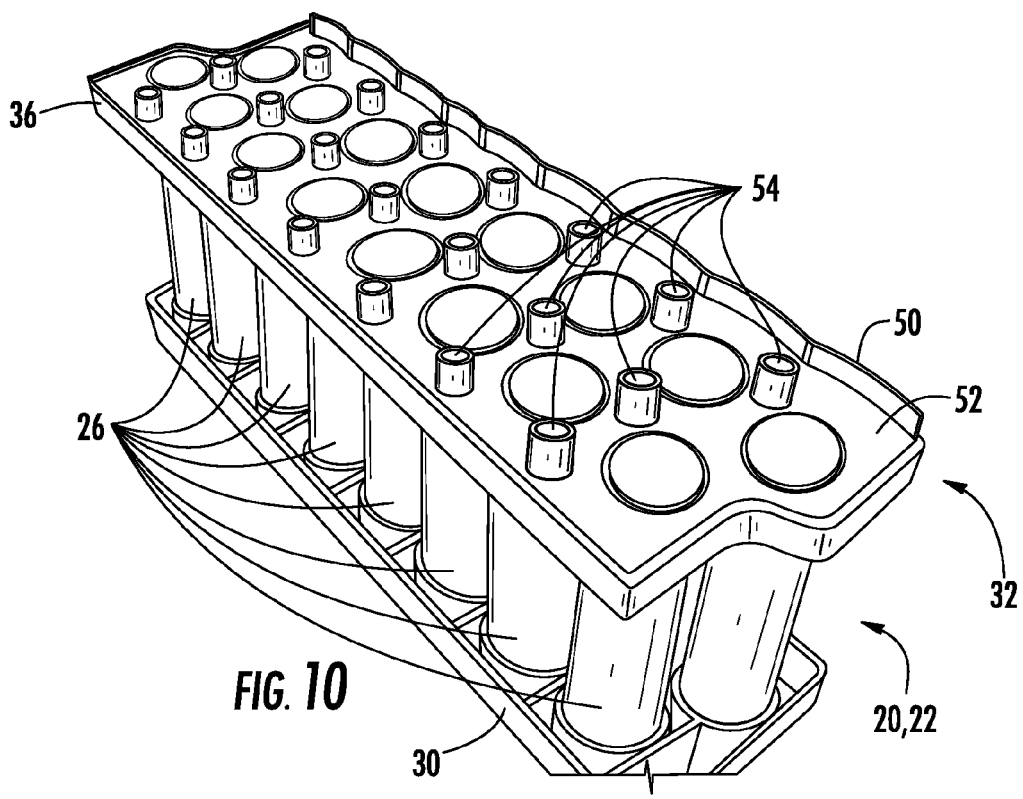
Figure 11:
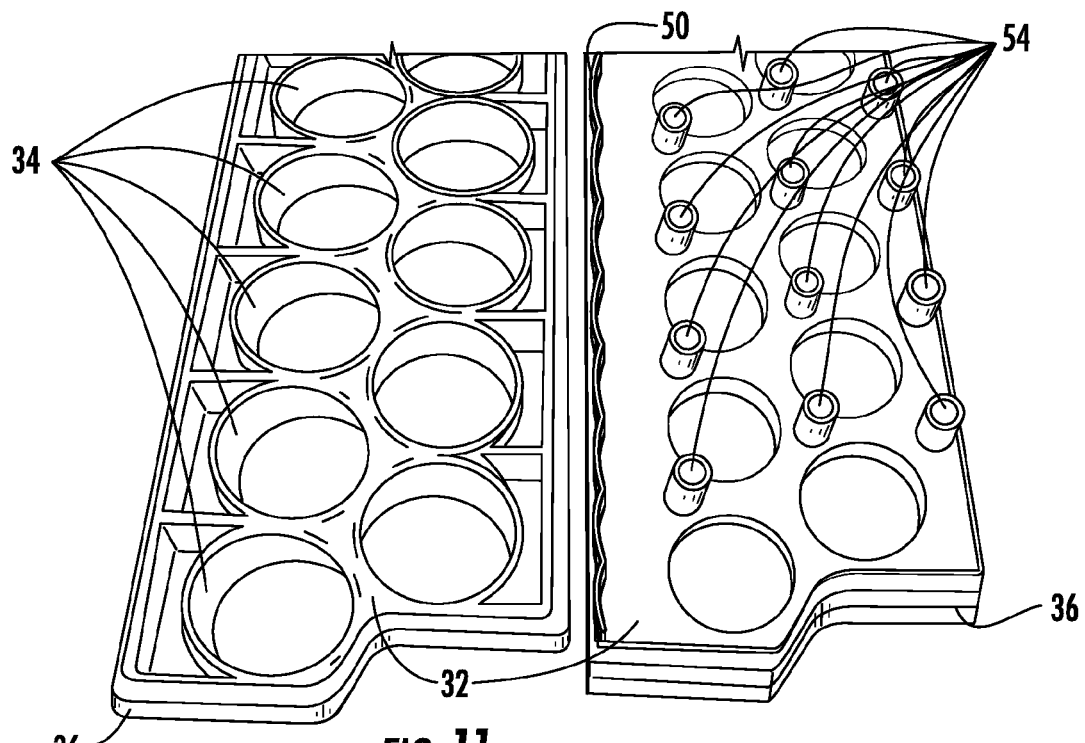
FIGS. 11 and 12 are perspective views of trays of the alternative embodiment of the battery module shown in FIGS. 9 and 10.

Referring to FIGS. 3, 10, and 11, the bottom or lower tray 32 for the battery packs 20, 22 is shown. The lower tray 32 includes openings, cutouts or sockets 34 (e.g., depressions, sleeves, hollows, etc.) that receive the cells 26 in a closely packed honeycomb-like arrangement (although the cells 26 may be arranged differently according to other exemplary embodiments). The walls of the sockets 34 help locate and align the cells 26 to properly space the cells 26 and allow cooling air to pass over and/or around the cells 26.

Figure 8:
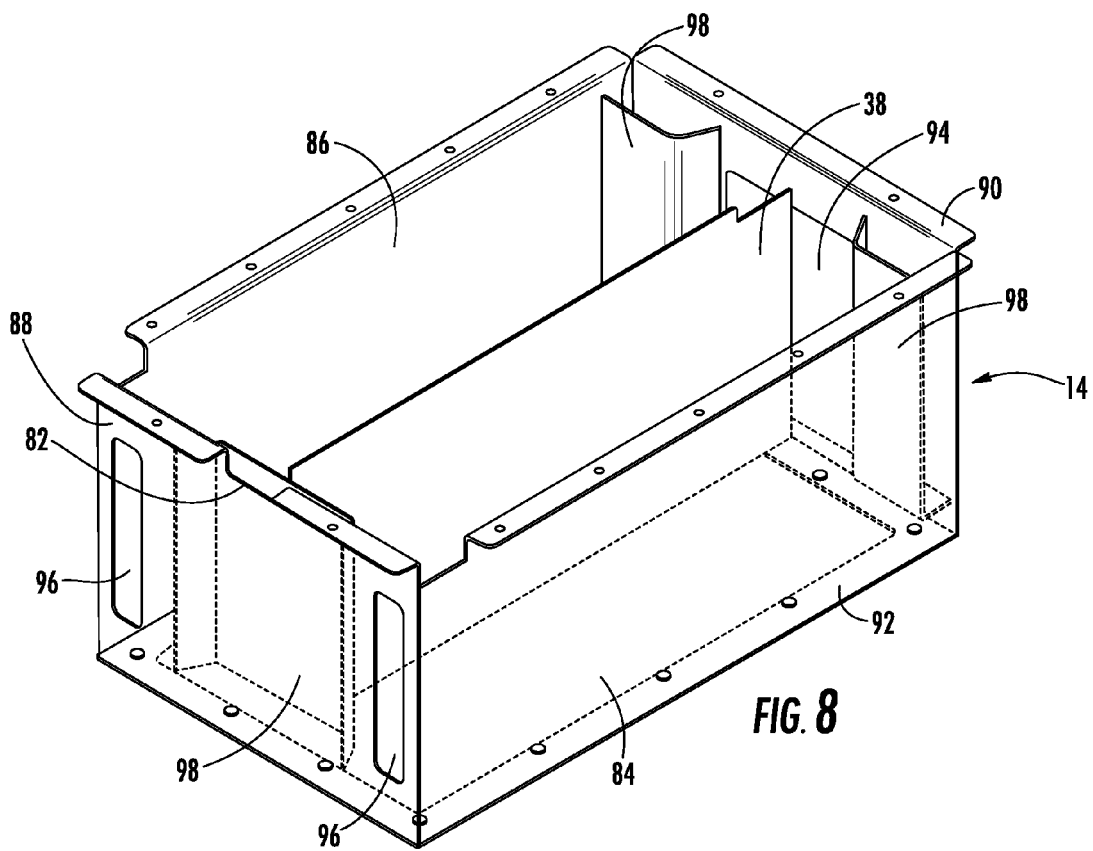
FIG. 8 is a perspective view of the housing for the battery module shown in FIG. 2.

According to an exemplary embodiment, the cells 26 are arranged in two groups, banks, or packs 20, 22 with two rows of cells 26 in each pack 20, 22. According to other exemplary embodiments, each pack may include three or four rows of batteries or cells and may be any suitable number of cells in length. The two packs 20, 22 are separated by a central plenum, air space or chamber 55 that may include a divider or panel 38, as shown in FIG. 8.

According to an exemplary embodiment, the batteries or cells 26 include a venting mechanism 40 on at least one end thereof (shown as a raised portion in FIG. 5) that allows the cell 26 to release internal gasses or effluent if a failure occurs to help avoid damage to the battery casing 42. The vents 40 allow a controlled release of gasses if an internal pressure reaches a predetermined limit.

Figures 4, 5:
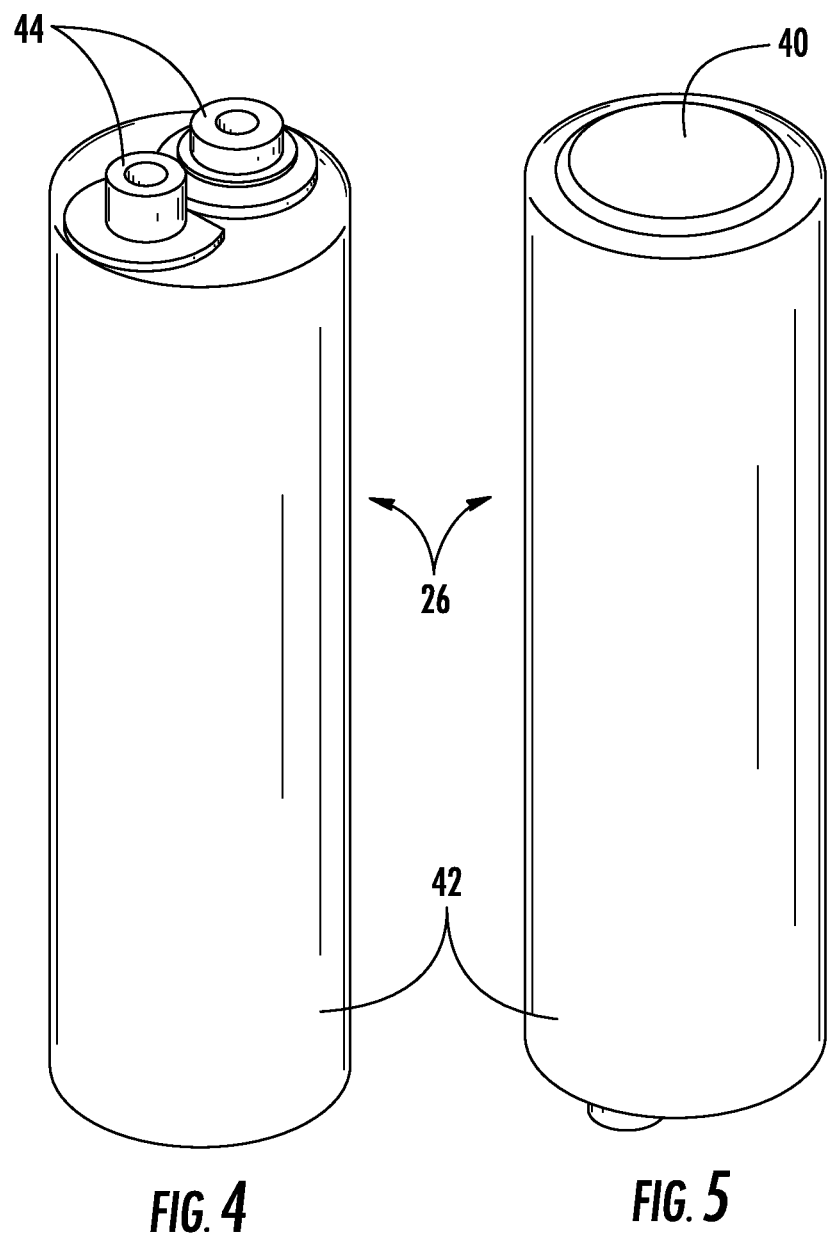
FIGS. 4 and 5 are perspective views of a battery from the battery module shown in FIG. 2.

The cells 26 are shown to include positive and negative terminals 44 (as shown in FIG. 4). Thus, the vent mechanism 40 may include a conventional pressure relief valve or other suitable valve arrangement. Terminals 44 of the cells 26 are connected by bus bars or connectors 24.

As shown in FIG. 3, the lower tray 32 includes a wall 50 extending downward from the bottom or floor 52 of the lower tray 32 that defines a common chamber or air space 55 below the cells 26. The lower tray 32 includes downward extending posts, protrusions or stand-offs 54 that support the floor 52 of the lower tray 32 over the chamber 55. Wall 50 may be about 10 mm in height according to an exemplary embodiment, but may differ in other embodiments The cells 26 are suspended above the chamber on shelves or ledges extending inwardly from the walls of the sockets 34. The cell vents 40 are in fluid communication with the chamber. In the unlikely event that a cell 26 fails, gasses released by the cell through the vent 40 will be retained in the chamber and kept generally isolated from the environment. The common air chamber may be directly or indirectly connected to outside vehicle 10. For instance, a hole or opening in the bottom of housing 14 may fluidly connect the common air chamber of released gasses to the atmosphere (for example, through the floor of vehicle 10).

Figure 12:
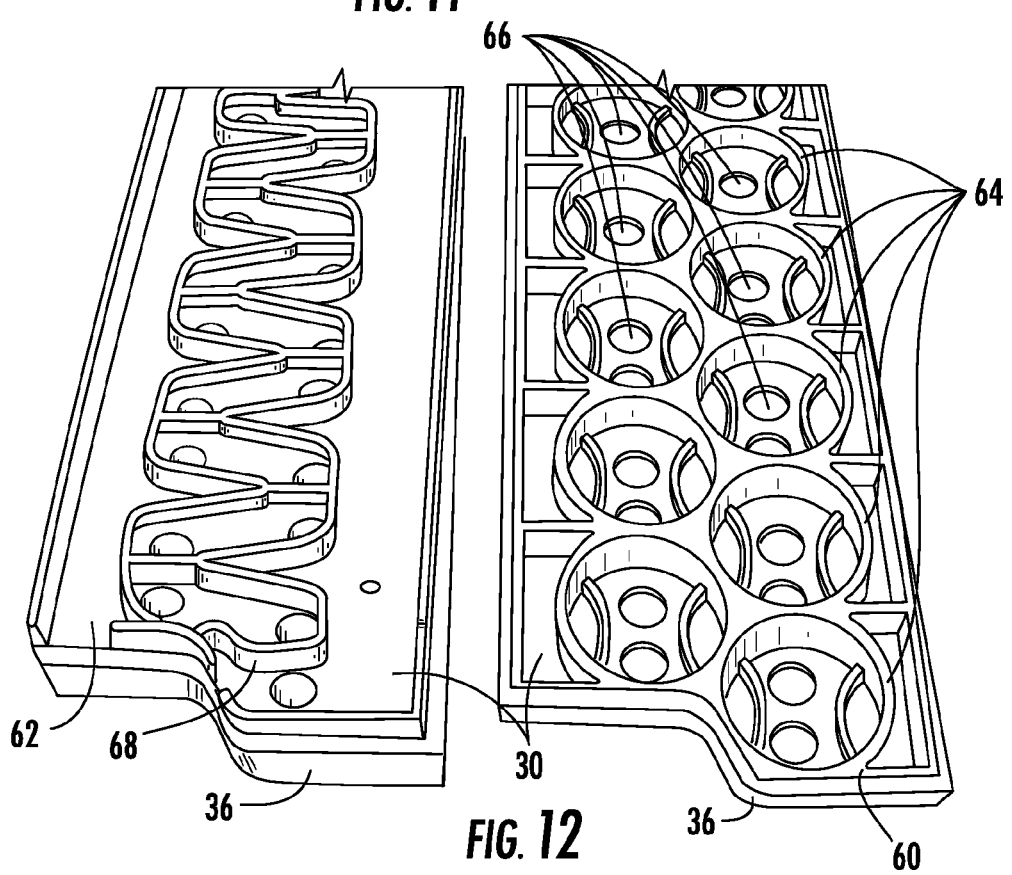

As shown in FIG. 12, the bottom or lower surface 60 of the upper trays 30 also includes cutouts or sockets 64 (e.g., depressions, sleeves, hollows, etc.) that receive the cells 26 in a closely packed honeycomb-like (or other type of) arrangement. Openings 66 in the upper trays 30 allow terminals 44 (seen in FIG. 4) from the cell 26 to pass through the upper tray 30.

Figure 6:
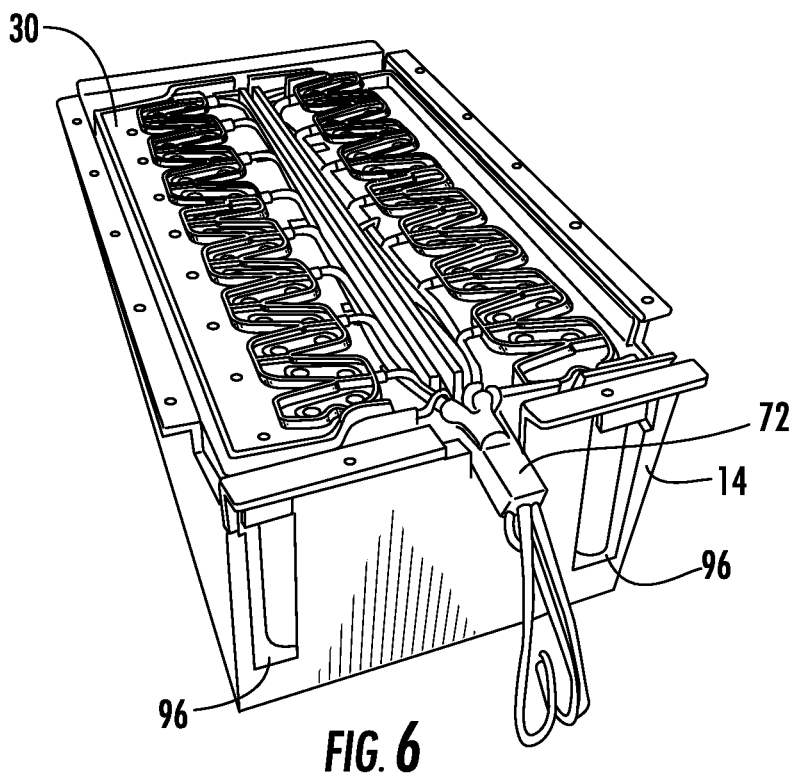
FIGS. 6 and 7 are perspective views of the battery module shown in FIG. 2.
Figure 7:
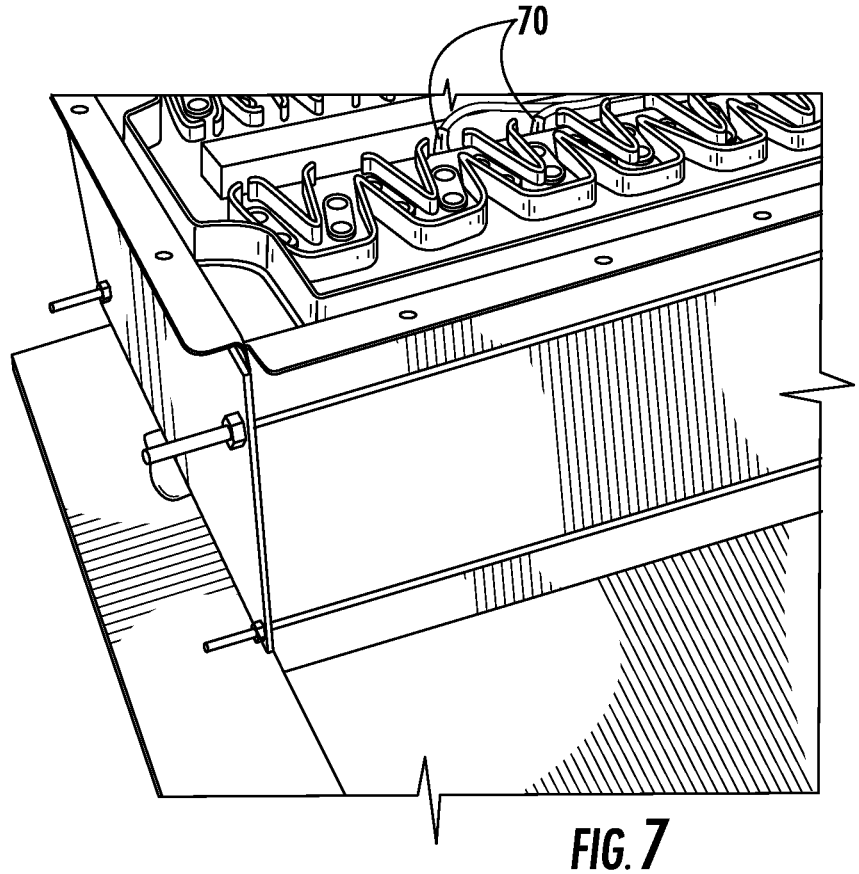

Bus bars or other suitable connectors 24 are coupled to the cell terminals 44 to connect the cells 26 together to form a circuit. The bus bars 24 are received by areas defined by raised projections or walls 68 that extend upward from the top surface 62 of the upper trays. The walls 68 protect and help to isolate the bus bars 44 to reduce the chance of a bus bar 24 or terminal 44 short-circuiting with another bus bar 24 or terminal 44. The walls 68 include slots or other openings (seen best in FIGS. 7 and 9) that allow sensors 70 (e.g. voltage sensors, current sensors, temperature sensors) to be connected to the bus bars 24 or terminals 44. These sensors 70 are connected to wires 72 that run down the length of the battery module 12 and pass through an opening 82 in the outer housing 14 (seen in the left panel in FIG. 8). While sensors 70 and wires 72 are shown connecting to only a portion of the cells 26 in FIG. 6, according to other exemplary embodiments, sensors 70 may be provided for all the cells 26 in the battery module 12. Temperature sensors may be located throughout the battery module 12. An electronic control unit (ECU) may receive input from the sensors and control operation of the battery module and system accordingly. For example, the ECU may control the operation of a cooling system for the battery module 12. For instance, the ECU may compare present values of the temperature sensors to a predetermined value and make the necessary changes to the cooling system (for example, increase, decrease, or maintain the amount of cooling).

According to an exemplary embodiment shown in FIGS. 2 and 3, the upper tray 30 for the two packs 20, 22 may be formed as a single unitary body and the lower tray 32 may be formed as a single unitary body. According to another exemplary embodiment, shown in FIGS. 6-7 and 9-12, the upper trays 30 and the lower trays 32 may be formed as separate bodies. A seal or gasket 36 may be provided around the circumference of the trays 30, 32 and around the cell sockets to isolate the common air chamber 55 for receiving vent gasses from the battery cells from the main volume of the battery module 12. Cooling air flows through the main volume of the module and passes over the batteries or cells 26.

The outer housing 14 of the battery module 12 (as shown, for example, in FIGS. 2 and 8) encloses the battery packs 20, 22. The outer housing 14 includes a front panel 84, back panel 86, left panel 88, right panel 90, bottom panel 92 and a top panel or cover (not shown). According to an exemplary embodiment, the housing 14 is formed from 1.5 mm thick sheet metal. The sheet metal may be painted, if desired. According to other exemplary embodiments, the housing 14 may be a polymer or other suitable material.

The housing 14 may include ribbing or other features suitably configured and positioned to strengthen and add rigidity to the outer housing 14. The housing 14 includes an inlet aperture or opening 94 on the right panel 90. The opening 94 is aligned generally with the central plenum air space and two outlet apertures or openings 96 on the left panel 88 disposed towards the front and back panels 84, 86. The divider 38 may run the length of the central plenum. According to other exemplary embodiments, the two openings 96 on the left panel 88 may be inlets and the opening 94 on the right panel 90 may be an outlet. The housing 14 may also include an opening on the left, right, front, back, and/or bottom panels 84, 86, 88, 90 that allows vented gas to escape from the lower plenum or chamber 55.

Inlet and outlet air baffles 16, 18 may be provided on the inside surface of the left and right panels (see, e.g., FIGS. 2, 3 and 8). Additionally, horizontal and vertical filler panels 98 may be provided in the housing 14. These filler panels 98 may be located in the corners or center of the interior of the outer housing 14. The filler panels and baffles are configured to provide relatively equal airflow within the module 12 (e.g., if there were too much space surrounding one of the cells 26 as compared to other cells 26, undesirable low pressure zones may be formed within the module 12). The cells 26 in each pack 20, 22 are arranged in two offset rows. The air baffles 16, 18 are configured to maintain an air space between the cells 26 on the ends of the offset rows and the air baffles 16, 18 that is similar to the air space of the other rows and the walls or panels 84, 86, 88, 90 of the housing 14. Cooling air passes from the opening 94, over the cells 26 and out the openings 96 to cool the cells 26. In an alternative embodiment, cooling air may pass from the openings 96, over the cells 26 and out the opening 94 to cool the cells 26. In another alternative embodiment, airflow may be bidirectional.

The air spaces provided in the housing 14 (and in the housing 214 discussed later) between the battery packs 20, 22 and the front and back panels 84, 86 of the housing and between the two packs 20, 22 allow the battery module 12 to be compressed without damaging the cells 26 (e.g., acting as crumple zones for the battery module 12 in the event of a vehicle collision). Generally, the battery module 12 would be placed in an area of the vehicle 10 that is configured to not deform in a collision (i.e. outside a "crumple zone"). But if an object or body intrudes into the space occupied by the battery module 12, the battery module 12 is configured to be partially crushed or compressed before the cells 26 begin to be deformed. The battery module 12 is designed with internal crumple zones that allow the module 12 to be compressed, for example, up to approximately 40% in the longitudinal direction (e.g., along the length of the module 12 as shown in FIG. 2) without substantially damaging the batteries or cells 26 included in the module 12.

Figure 15:
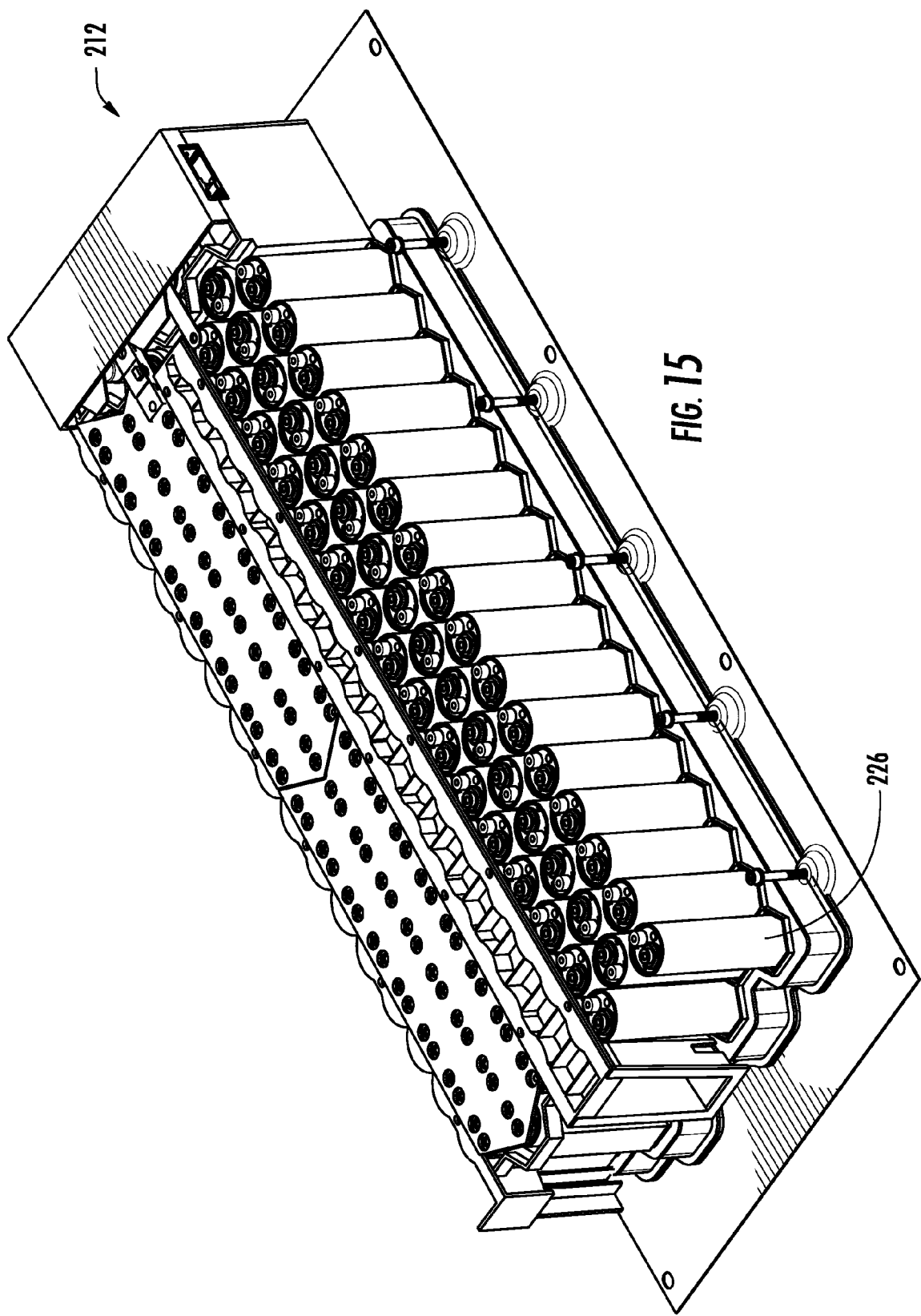
FIG. 15 is a perspective partial cutaway view of the battery module shown in FIG. 13.
Figure 16:
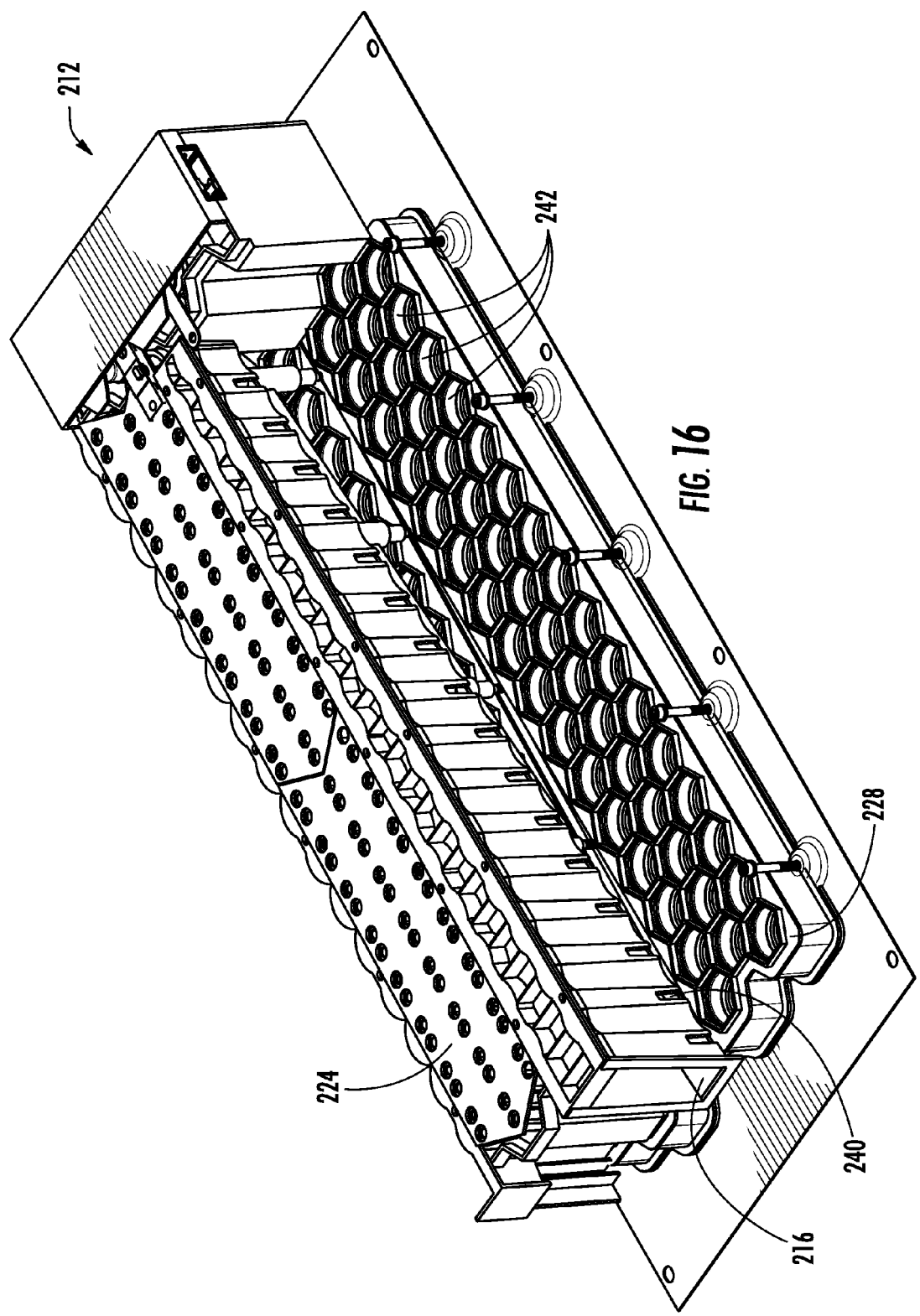
FIG. 16 is a perspective partial cutaway view of the battery module shown in FIG. 13.
Figure 17:
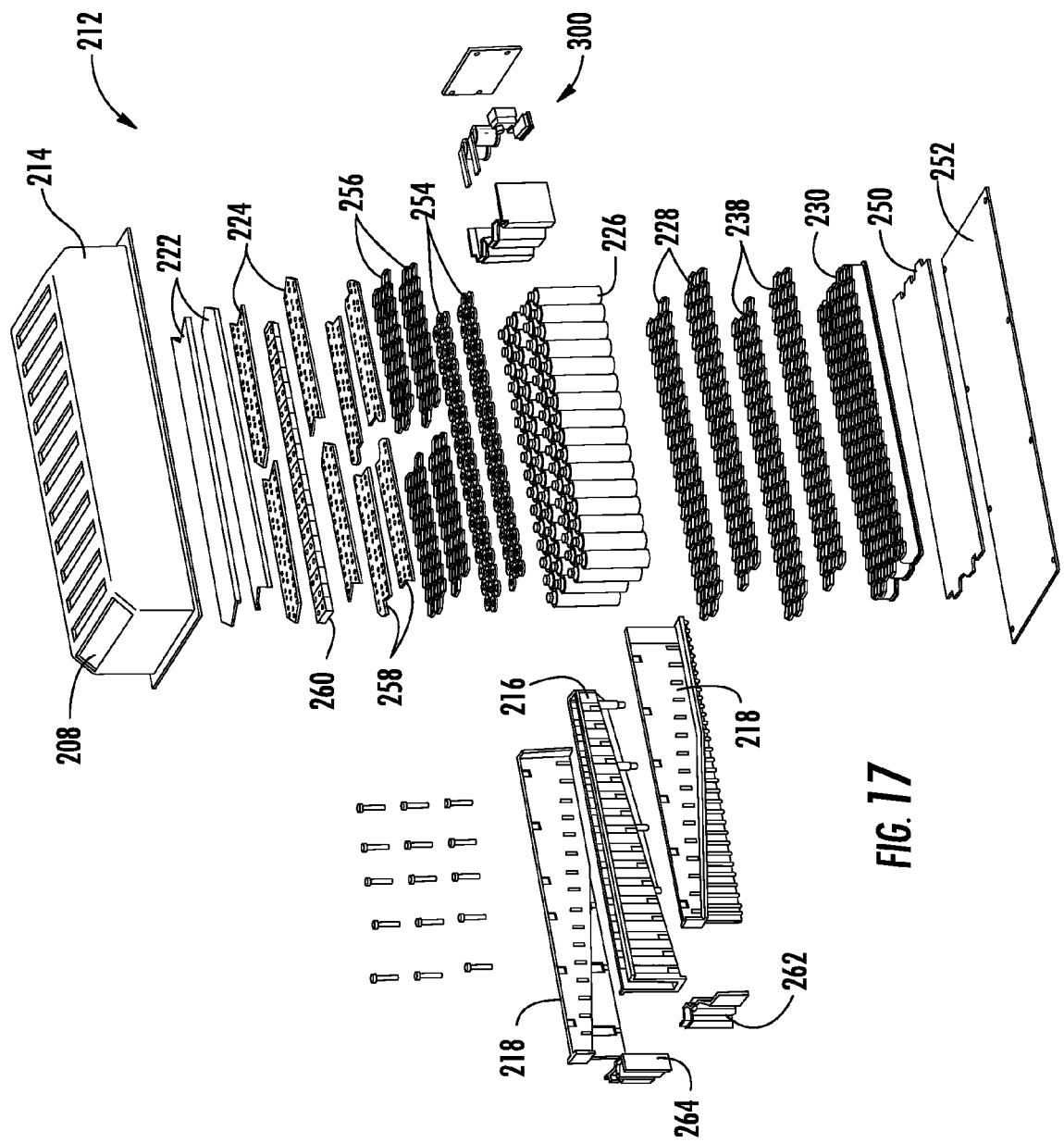
FIG. 17 is an exploded perspective view of the battery module shown in FIG. 13.
Figure 20:
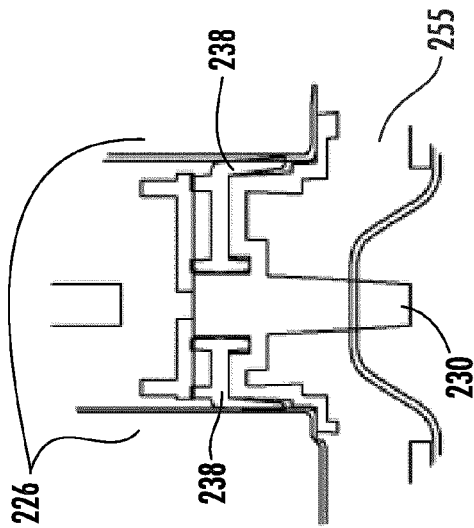
FIG. 20 is an enlarged detail view of the battery module shown in FIG. 18.

Referring to FIGS. 13-21, another exemplary embodiment of a battery module is shown. The embodiment shown in these figures is similar to the embodiment described above and contains many of the same features or elements, as evident from the drawings. Referring to FIG. 17, a battery module 212 is shown according to an exemplary embodiment. Battery module 212 is shown to include a base plate 252, a lower tray sealing plate 250, a lower tray 230, a seal 238, a seal clamping plate 228, and multiple batteries or cells 226 (arranged in two separate battery groups or packs). Battery module 212 is also shown to include two wall plenums or external air chambers 218, a central plenum or central air chamber 216, and battery pack end plates 262, 264. Battery module 212 is also shown to include a battery disconnect unit (BDU) 300 which includes a housing, a current sensor, a pre-charge resistor, a pre-charge relay and a contactor. Battery module 212 is also shown to include cell clamping pads 254, upper trays 256, bus bar assemblies 258, a central air chamber cover 260, cell supervising controller (CSC) boards 224, CSC covers 222, and a cover or housing 214.

Figure 13:
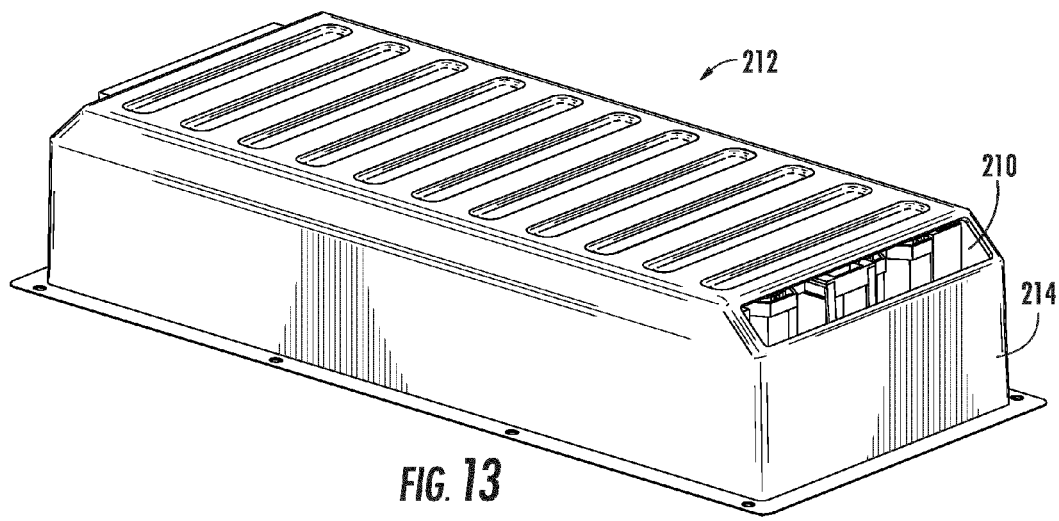
FIG. 13 is a perspective view of a battery module according to another exemplary embodiment.
Figure 18:
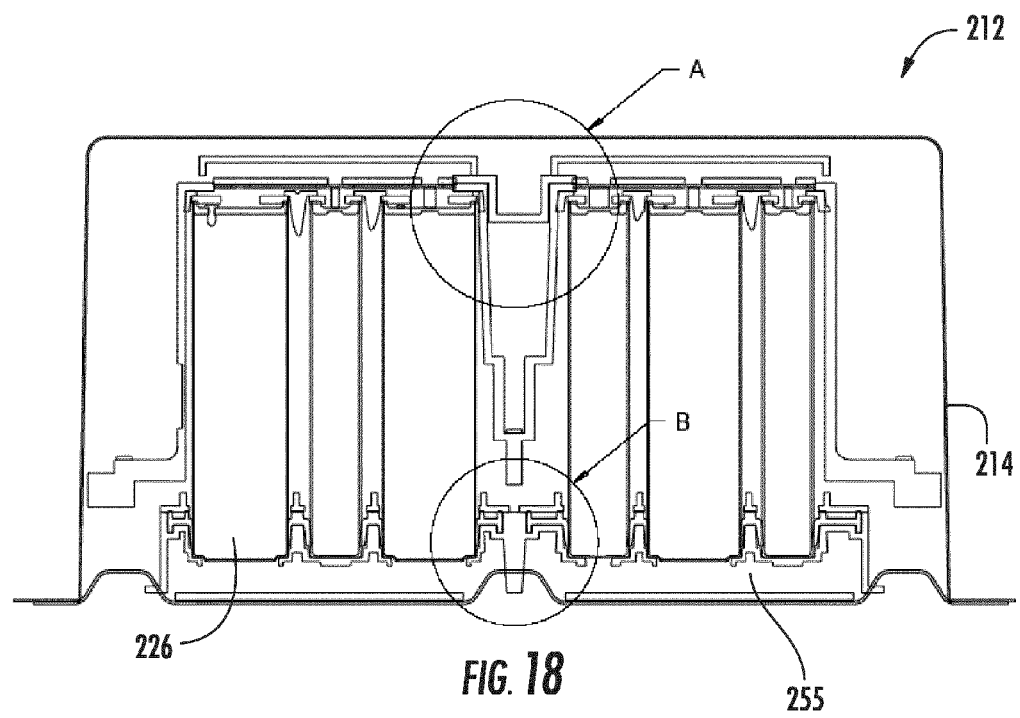
FIG. 18 is a sectional view of the battery module shown in FIG. 13.

As shown in FIG. 13, a battery module 212 may include a housing 214. As shown, housing 214 is made from two pieces and comprises a bottom or base plate 252 and a cover with a top, front, back, first side and second side. In an alternative embodiment, housing 214 may be made from more or less than two pieces. Openings 208 and 210 (shown in FIGS. 13 and 17) are provided in housing 214 to provide an inlet and outlet for cooling air from a cooling system. In an alternative embodiment, these openings may be located elsewhere on housing 214. Cooling air flow may enter opening 208 and exit opening 210 or cooling air may enter opening 210 and exit opening 208.

Figure 14:
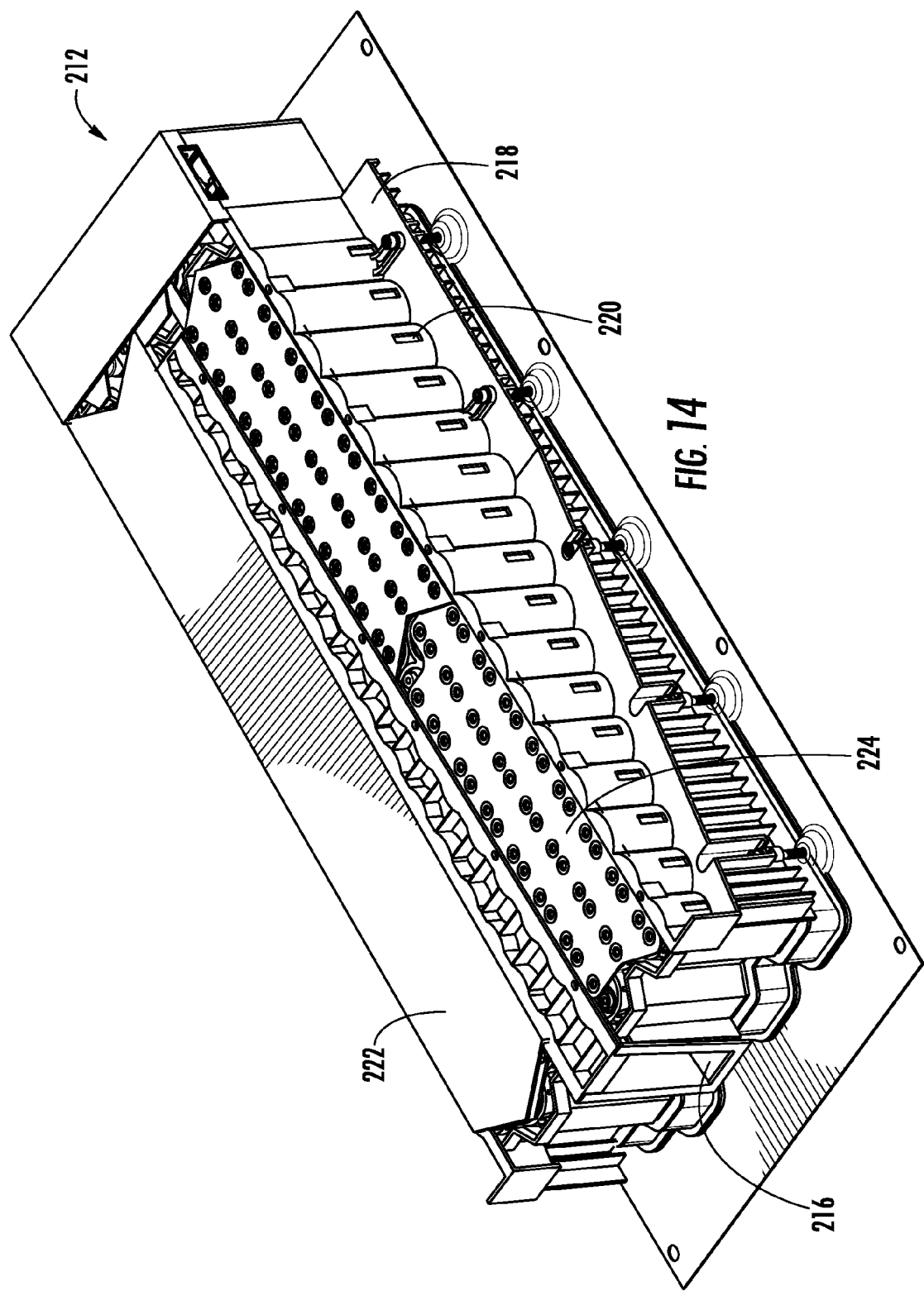
FIG. 14 is a perspective partial cutaway view of the battery module shown in FIG. 13.

Referring to FIG. 14, battery module 212 is shown without the cover or housing 214 and without one CSC cover 222. Battery module 212 has two external air chambers, one for each battery pack. The external air chamber 218 is shown in FIG. 14 to include openings 220. These openings 220 may be generally rectangular as shown or may be any suitable shape and size. As shown, there is one opening 220 per adjacent cell 226. In alternative embodiments, there may be more openings 220 per adjacent cell, or there may be openings 220 on less than every adjacent cell. As shown, external air chamber 218 has a taper in a first direction. This taper is to create or allow substantially constant air velocity through the battery module 212.

As shown, cooling air enters the external air chamber 218 near the BDU (through opening 210 in housing 214) where there is no taper. Cooling air leaves external air chamber 218 through openings 220, passing by and around cells 226 to the central air chamber 216. The volume of cooling air decreases as cooling air advances along external air chamber 218. The tapered shape of the chamber 218 functions to create substantially constant cooling air velocity throughout the external air chamber 218. In an alternative embodiment, the air flow may be in a direction opposite of that described above. In yet another alternative embodiment, the external air chamber 218 may allow for bidirectional air flow.

Still referring to FIGS. 15-17, the central air chamber 216 is shown to be located between the two battery packs. As shown, the central air chamber 216 is configured to receive cooling air from the external air chambers 218 after it passes through the battery packs. Central air chamber 216 may have any number of inlets and outlets. Cooling air enters the central air chamber 216 through openings 240. Openings 240 may be any suitable size or shape and may be located in any suitable location in central air chamber 216. Cooling air exits the central air chamber 216 though an opening at the end of the central air chamber 216. The central air chamber 216 is shown to include a taper in a first direction (vertical) and a second direction (horizontal). These tapers are configured to create substantially constant air flow velocity. As shown, central air chamber 216 starts out with a relatively small cross sectional area at the beginning of the central air chamber 216 and ends with a relatively large cross sectional area near the exit of the central air chamber 216. In an alternative embodiment, cooling air may flow in a direction opposite of what was just described. For instance, cooling air may enter the large opening of the central air chamber 216 and exit through the smaller openings 240. In another alternative embodiment, the central air chamber 216 may allow for bidirectional air flow.

Figure 21:
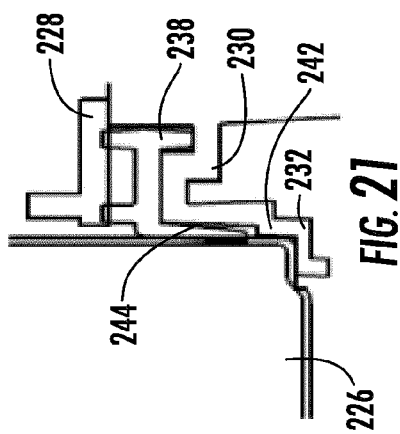
FIG. 21 is an enlarged detail view of the battery module shown in FIG. 18.
Figure 19:
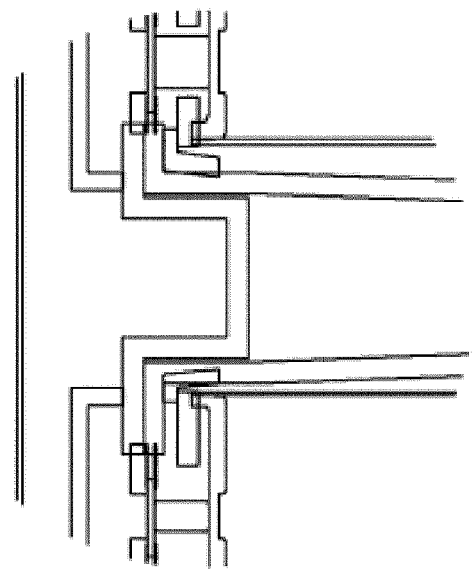
FIG. 19 is an enlarged detail view of the battery module shown in FIG. 18.

Referring to FIGS. 15-17, the bottom or lower tray 230 for the batteries or cells 226 is shown. The cells are arranged into two groups or packs. The lower tray 230 includes cutouts or sockets 242 (e.g., depressions, sleeves, hollows, etc.) that receive the cells 226 in a closely packed honeycomb-like arrangement (although the cells 226 may be arranged differently according to other exemplary embodiments). The walls of the sockets 242 help locate and align the cells 226 to properly space the cells 226 and allow cooling air to pass over and/or around them. As shown in FIGS. 15-17, lower tray 230 is a single unitary member. In an alternative embodiment, lower tray 230 may be two separate pieces. The sockets 242 may include shelves or ledges 232 (as shown in FIG. 21) on which the cells 226 may rest. Similar to battery module 12, battery module 212 includes a common air plenum or chamber 255 between the lower tray 230 and the bottom of the housing 214. The common air chamber is configured to receive released gasses from cells 226. The chamber 255 is bounded on the sides by the walls 235 of the lower tray 230 and on the bottom by a tray sealing plate lower 250 and the base plate 252 of the housing 214.

Referring to FIG. 17, the battery module 212 is shown with upper trays 256. Upper trays 256 are similar to the upper trays 30 of battery module 12. Upper trays 256 have a greater lead-in tolerance than lower tray 232. As such, upper trays 256 perform less of a holding function of cells 226 than lower trays 232. Cell clamping pads 254 may be used in combination with the upper trays to help even the clamping load or compression on the cells 226 and to reduce rattle in the battery module 212.

Referring to FIGS. 17-21, the battery module 212 is shown to include seals 238 that are clamped between the lower tray 230 and the seal clamping plates 228. The seals 238 positively seal in any released gasses from cells 226. As can be seen in FIG. 21, seals 238 include an extension or flap 244 that presses up against the cell 226. As pressure increases in the common air chamber, the pressure presses extension 244 against cell 226 to aid in sealing. Seal 238 also includes multiple ridges or raised portions to help positively (hermetically) seal the common air chamber from the rest of the module 212. As discussed above, gasses in the common air chamber may be vented outside the vehicle 10 through a hole in housing 214 and vehicle 10.

The cooling system for the battery module 12, 212 may be integrated with the cooling system for the interior of the vehicle 10 or it may be a separate cooling system. Cooling air may be connected to battery module 12, 212 by duct work, which may be made from, for example, sheet metal or a suitable metal of polymeric material. Cooling air may be pushed (for example, by a fan) through the battery module 12, 212. Cooling air may also be pulled (for example, by a vacuum pump) through the battery module 12, 212. In addition, the cooling air may flow from the central air plenum or chamber between the battery packs to the external air chamber between the battery packs and the sides or walls of the housing. Alternatively, the cooling air may flow from the external air chamber between the battery packs and the sides or walls of the housing to the central air plenum or chamber between the battery packs. The cells 26, 226 generally conduct heat well in the axial direction. As a result, the area of the cells covered by the walls of the sockets 34, 64, 242 does not significantly reduce the heat transfer from the cells 26, 226 to the cooling air.

It should be noted that references to "front," "back," "upper," and "lower" in this description are merely used to identify various elements as are oriented in the FIGURES, with "front" and "back" being relative the vehicle in which the battery assembly is placed.

The construction and arrangement of the elements of the battery modules 12 as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., materials for formation of the conductive and insulating components, technology for the internal components of the cells 26, the shape of the cells 26, etc.). For example, elements shown as integrally formed may be constructed of multiple parts or elements, the position of elements may be reversed or otherwise varied, and the nature or number of discrete elements or positions may be altered or varied. It should be noted that the elements and/or assemblies of the battery module may be constructed from any of a wide variety of materials that provide sufficient strength or durability (such as aluminum, steel, copper) in any of a wide variety of colors, combinations and suitable materials. Other substitutions, modifications, changes and omissions may be made in the design, operating conditions and arrangement of the preferred and other exemplary embodiments without departing from the scope of the present inventions. The order or sequence of any process or method steps may be varied or re-sequenced according to alternative embodiments. Other substitutions, modifications, changes and omissions may be made in the design, operating configuration and arrangement of the preferred and other exemplary embodiments without departing from the spirit of the present inventions as expressed herein.

What is claimed is:

1. A battery module comprising:
a plurality of cells;
a housing configured to substantially enclose the plurality of cells; and
a lower tray configured to receive the plurality of cells and located inside the housing adjacent a bottom of the housing, and includes a top side and a bottom side, the top side having a plurality of sockets configured to receive the plurality of cells in a closely packed arrangement, the bottom side configured to define a chamber between the lower tray and the bottom of the housing, the chamber being sealed off from the rest of the battery module and configured to receive released gas from the plurality of cells;
the housing including an opening configured to fluidly connect the chamber to atmosphere.

2. The battery module of claim 1, further comprising a seal located on the top side of the lower tray and configured to seal the connection between the plurality of cells and the lower tray to maintain the gas in the chamber.

3. The battery module of claim 2, further comprising a clamping plate located above the seal to clamp the seal between the lower tray and the clamping plate.

4. The battery module of claim 1, wherein the plurality of cells are arranged in a first cell pack and a second cell pack such that a central air chamber exists between the first cell pack and second cell pack.

5. The battery module of claim 4, wherein the first cell pack and the second cell pack each comprise at least two rows of cells.

6. The battery module of claim 4, wherein the central air chamber is connected at a first end to a first opening in the housing and at a second end to a second opening in the housing opposite the first opening, wherein the first opening is a cooling air inlet and the second opening is a cooling air outlet.

7. The battery module of claim 6, wherein the central air chamber is tapered in a first direction and in a second direction in order to provide substantially constant velocity air flow through the battery module.

8. The battery module of claim 4, further comprising a first external air chamber located between the first cell pack and a front of the housing, and a second external air chamber located between the second cell pack and a back of the housing.

9. The battery module of claim 8, wherein the external air chambers are tapered in a first direction to provide substantially constant velocity air flow through the battery module.

10. The battery module of claim 9, wherein the taper in the first direction of the external air chamber is opposite of the taper in the first direction of the central air chambers.

11. The battery module of claim 1, wherein the bottom side of the lower tray further comprises multiple protrusions extending from the bottom side of the lower tray through the chamber to the bottom of the housing.

12. The battery module of claim 1, further comprising an upper tray located inside the housing and adjacent a top of the housing and having a top side and a bottom side, the bottom side has a plurality of sockets configured to receive the plurality of cells.

13. The battery module of claim 12, wherein the upper tray further comprises a plurality of openings to allow terminals of the cells to pass through.

14. The battery module of claim 13, wherein the top side of the upper tray further comprises raised walls.

15. The battery module of claim 14, wherein the raised walls include slots that allow sensors to be connected to the plurality of cells.

16. A battery module comprising:
a plurality of cells;
a housing configured to contain the plurality of cells;
a lower tray located inside the housing adjacent a bottom of the housing, the lower tray comprising a plurality of sockets, each socket configured to receive one of the plurality of cells;
an upper tray located inside the housing adjacent a top of the housing; the upper tray comprising a plurality of sockets, each socket configured to receive the corresponding cell from the lower tray;
a common chamber defined by a bottom of the lower tray and the bottom of the housing, the common chamber configured to receive gas expelled from the plurality of cells;
a seal located on an upper side of the lower tray and configured to seal the connection between the plurality of cells and the lower tray to maintain the gas in the common chamber; and
a clamping plate located above the seal to clamp the seal between the lower tray and the clamping plate;
wherein the housing includes an opening configured to fluidly connect the common chamber to atmosphere.

17. The battery module of claim 16, wherein the plurality of cells are arranged into a first cell pack and a second cell pack, wherein a central air chamber is located in between the first cell pack and the second cell pack, a first external air chamber is located between the first cell pack and a first side of the housing, and a second external air chamber is located between the second cell pack and a second side of the housing opposite the first side of the housing.

18. The battery module of claim 17, wherein the central air chamber is tapered in a first direction in order to provide substantially constant velocity air flow through the battery module.

19. The battery module of claim 17, wherein the central air chamber is tapered in a first direction and in a second direction in order to provide substantially constant velocity air flow through the battery module.

20. The battery module of claim 17, wherein the external air chambers are tapered in a first direction in order to provide substantially constant velocity air flow through the battery module.

21. The battery module of claim 17, wherein the taper in the first direction of the external air chamber is opposite a taper of the first direction of the central air chambers.

* * * * *